(12) United States Patent
Souma et al.

(10) Patent No.: US 8,308,214 B2
(45) Date of Patent: *Nov. 13, 2012

(54) LOWER STRUCTURE OF VEHICLE BODY REAR PART

(75) Inventors: Takayuki Souma, Hamamatsu (JP); Norio Nishida, Hamamatsu (JP)

(73) Assignee: Suzuki Motor Corporation, Shizuoken-Ken (JP)

( * ) Notice: Subject to any disclaimer, the term of this patent is extended or adjusted under 35 U.S.C. 154(b) by 78 days.

This patent is subject to a terminal disclaimer.

(21) Appl. No.: 12/950,068

(22) Filed: Nov. 19, 2010

(65) Prior Publication Data

US 2011/0121613 A1     May 26, 2011

(30) Foreign Application Priority Data

Nov. 26, 2009   (JP) ................................. 2009-268719

(51) Int. Cl.
*B62D 43/00* (2006.01)
(52) U.S. Cl. .................................. 296/37.2; 296/187.11
(58) Field of Classification Search .................. 296/37.2, 296/187.11
See application file for complete search history.

(56) References Cited

U.S. PATENT DOCUMENTS

| 6,231,097 B1* | 5/2001 | Schell et al. ................. 296/37.2 |
| 6,672,639 B2* | 1/2004 | Kosuge et al. ............... 296/37.2 |
| 7,540,559 B2* | 6/2009 | Egawa et al. ............ 296/203.04 |

FOREIGN PATENT DOCUMENTS

| JP | 09-002336 A | 1/1997 |
| JP | 2006-088740 A | 4/2006 |
| JP | 2009-179181 A | 8/2009 |

* cited by examiner

*Primary Examiner* — Joseph Pape
(74) *Attorney, Agent, or Firm* — Alston & Bird LLP

(57) ABSTRACT

A lower structure of a vehicle body rear part includes a spare tire housing formed on a rear floor, a rear cross member disposed in front of the spare tire housing to connect side frames, and a hook reinforcing member disposed in the center in the vehicle width direction on the lower surface of the spare tire housing and extending in the vehicle longitudinal direction. The front end portion of the hook reinforcing member is connected to the rear cross member, and the rear end portion thereof extends to the rear end portion of the rear floor. The side frame at the vehicle rear of the rear cross member is divided into a frame front part and a frame rear part in the vehicle longitudinal direction, and the hook reinforcing member is divided into a reinforcing member front part and a reinforcing member rear part in the vehicle longitudinal direction. The frame front part has a rigidity higher than that of the frame rear part, and the reinforcing member rear part has a rigidity higher than that of the reinforcing member front part, and the two division positions coincide with each other in the longitudinal direction.

4 Claims, 5 Drawing Sheets

LOWER STRUCTURE OF VEHICLE BODY REAR PART

BACKGROUND OF THE INVENTION

1. Field of the Invention

The present invention relates to a lower structure of a vehicle body rear part of a vehicle provided with a spare tire housing formed on a rear floor.

2. Description of Related Art

In a common vehicle, a spare tire housing for housing a spare tire is provided at a rear floor in a vehicle body rear part. For the vehicle having such a structure, when a load is applied from the vehicle rear, the spare tire moves toward the vehicle front, and accordingly the spare tire housing may be deformed and may move to the vehicle front. In particular, since a fuel tank is disposed in front of the spare tire housing, the deformed spare tire housing may unfavorably contact with the fuel tank.

In such a case, countermeasures are conceivable such that the load is absorbed by the surroundings of the spare tire housing by securing a sufficient space between the spare tire housing and a back panel. Also, in the case in which the fuel tank is disposed in front of the spare tire housing, countermeasures are conceivable such that the load is absorbed by the surroundings of the spare tire housing by securing a sufficient distance between the spare tire housing and the fuel tank.

On the other hand, a space for arranging parts other than the spare tire housing and fuel tank must also be secured, and many restrictions are placed on the layout of vehicle body parts. Therefore, the space in the rear of the spare tire housing, the distance between the spare tire housing and the fuel tank, and the like cannot be secured sufficiently in many cases. Also, if an attempt is made to sufficiently secure the space in the rear of the spare tire housing, the distance between the spare tire housing and the fuel tank, and the like, there arises a problem of increased size of vehicle body, which poses a serious problem especially in the case of a compact car.

Furthermore, a rear seat is disposed on the front upper side of the spare tire housing, and when a load is applied from the vehicle rear, the spare tire may move to the front upper side. In this case, there arises a problem that the spare tire contacts with the rear seat.

Therefore, in the structure disclosed in, for example, JP 09-2336 A, to avoid the contact of the deformed spare tire housing with the fuel tank, the spare tire is housed in the state in which the front side of the spare tire is raised from the installation position of the fuel tank to tilt the spare tire.

Also, in the structure disclosed in JP 2006-88740 A, to avoid the contact of the deformed spare tire housing with the fuel tank and to prevent the front end of the spare tire from contacting with the rear seat, the spare tire is housed in a state in which the rear side of the spare tire is raised from the installation position of the fuel tank to tilt the spare tire, and also a hook reinforcing member for a traction hook, extending in the vehicle longitudinal direction, is provided at a central position in the vehicle width direction on the lower surface of the spare tire housing. In this case, when a load is applied from the vehicle rear, the deformation of the spare tire housing is restrained.

Furthermore, in the structure disclosed in JP 2009-179181 A, the configuration is such that the spare tire is tiltingly disposed in the spare tire housing in a state of being tilted forward, and the rear portion of spare tire is jumped up with the front portion thereof being the center and is turned in the longitudinal direction toward the vehicle front when a load is applied from the vehicle rear. Therefore, the load applied to the front structures by the front end of the spare tire is reduced.

However, in the case of only the structure such that the spare tire is housed in the state in which the front side of the spare tire is raised from the installation position of the fuel tank to tilt the spare tire as in JP 09-2336 A, the spare tire moves easily toward the front upper side when a load is applied from the vehicle rear. Therefore, the spare tire may still contact with the rear seat.

Also, in the case of the structure such that the hook reinforcing member extending in the vehicle longitudinal direction is provided on the lower surface of the spare tire housing as in JP 2006-88740 A, there arises a problem that the deformation and movement of the spare tire housing cannot be restrained sufficiently.

Furthermore, in the case of the structure such that the spare tire is housed in the spare tire housing in the state in which the rear side of spare tire is raised and the front side of spare tire is tilted downward as in JP 2009-179181 A, there arises a problem that if the tilt is increased for sufficient turning in the longitudinal direction, the vertical dimension of a luggage space decreases, and also there arises a problem that it is difficult to promote the jumping-up of the rear part of the spare tire.

SUMMARY OF THE INVENTION

The present invention has been made in view of the above circumstances, and accordingly an object thereof is to provide a lower structure of a vehicle body rear part capable of preventing the deformation of a spare tire housing to the vehicle front and the movement of a spare tire to the vehicle front and capable of promoting the jumping-up of the rear portion of the spare tire when a load is applied from the vehicle rear.

To achieve the above object, the present invention provides a lower structure of a vehicle body rear part, including a spare tire housing formed at a rear floor in the vehicle body rear part; a rear cross member disposed in front of the spare tire housing to connect the right side frame and the left side frame to each other; and a hook reinforcing member for a traction hook, which is disposed in the center in the vehicle width direction on the lower surface of the spare tire housing and extends in the vehicle longitudinal direction, the front end portion of the hook reinforcing member being connected to the rear cross member, and the rear end portion thereof extending to the rear end portion of the rear floor, wherein the side frame at the vehicle rear of the rear cross member is divided into a frame front part and a frame rear part in the vehicle longitudinal direction, and the hook reinforcing member is divided into a reinforcing member front part and a reinforcing member rear part in the vehicle longitudinal direction; and of the side frame at the vehicle rear of the rear cross member, the frame front part has a rigidity higher than that of the frame rear part; of the hook reinforcing member, the reinforcing member rear part has a rigidity higher than that of the reinforcing member front part; and a division position of the frame front part and the frame rear part and a division position of the reinforcing member front part and the reinforcing member rear part coincide with each other in the longitudinal direction.

In the present invention, the rigidity of the frame front part is enhanced by attaching a spring plate reinforcing member, and the rigidity of the reinforcing member rear part is enhanced by making the closed cross sectional area on the lower side larger than that on the upper side and by attaching the traction hook.

Also, in the present invention, the rear floor is provided with a bead extending in the vehicle width direction; and the position of the bead, the division position of the frame front part and the frame rear part, and the division position of the reinforcing member front part and the reinforcing member rear part coincide with each other.

Furthermore, in the present invention, the closed cross sectional area of the reinforcing member rear part increases toward the vehicle rear, and a substantially horizontal plane part formed in a maximum closed cross sectional area portion of the reinforcing member rear part is mounted with the traction hook.

As described above, the lower structure of a vehicle body rear part in accordance with the present invention includes a spare tire housing formed on a rear floor in the vehicle body rear part; a rear cross member disposed in front of the spare tire housing to connect the right side frame and the left side frame to each other; and a hook reinforcing member for a traction hook, which is disposed in the center in the vehicle width direction on the lower surface of the spare tire housing and extends in the vehicle longitudinal direction, the front end portion of the hook reinforcing member being connected to the rear cross member, and the rear end portion thereof extending to the rear end portion of the rear floor. The side frame at the vehicle rear of the rear cross member is divided into a frame front part and a frame rear part in the vehicle longitudinal direction, and the hook reinforcing member is divided into a reinforcing member front part and a reinforcing member rear part in the vehicle longitudinal direction. Of the side frame at the vehicle rear of the rear cross member, the frame front part has a rigidity higher than that of the frame rear part; of the hook reinforcing member, the reinforcing member rear part has a rigidity higher than that of the reinforcing member front part; and a division position of the frame front part and the frame rear part and a division position of the reinforcing member front part and the reinforcing member rear part coincide with each other in the longitudinal direction. Therefore, when a load is applied from the vehicle rear to the vehicle body rear part, the deformation of the side frame proceeds from the frame rear part having a low rigidity, and on the other hand, the reinforcing member rear part of the hook reinforcing member begins to move to the vehicle front on receipt of the load, a bumper member moves to the vehicle front, and the load is transmitted to the reinforcing member front part.

The load transmitted to the reinforcing member front part is transmitted to the rear cross member. If the rear cross member cannot receive the transmitted load and is deformed by the load, the reinforcing member front part is deformed with the connecting portion with the rear cross member being the center, and also the reinforcing member rear part keeps its shape while being deformed because of its high rigidity, and the rear end thereof moves upward. Therefore, the rear floor and the hook reinforcing member are deformed into a valley form (a V shape). Also, since the frame rear part of the side frame has a low rigidity, a load that promotes the valley-form deformation of the hook reinforcing member is applied easily, so that the valley-form deformation occurs easily. That is, after the deformation has proceeded to some degree, the side frame is bendingly deformed with the division position of the frame front part and the frame rear part, which is a rigidity changing point, being the center. In this case, the side frame is deformed easily in the same direction as that of the bending deformation of the rear floor and the hook reinforcing member. At this time, if the side frame is formed in advance so as to be curved downward slightly with the division position of the frame front part and the frame rear part being the center, or a concave part or a bead part is formed on the upper side of the division position, the valley-form deformation of the side frame can be induced.

Therefore, according to the lower structure of the vehicle body rear part of the present invention, the rear portion of a spare tire placed so as to tilt forward jumps up with the front portion thereof being the center, so that the turn of the spare tire in the longitudinal direction toward the vehicle front can be promoted, and also the load applied from the vehicle rear can be absorbed reliably.

In the present invention, the rigidity of the frame front part is enhanced by attaching a spring plate reinforcing member, and the rigidity of the reinforcing member rear part is enhanced by making the closed cross sectional area on the lower side larger than that on the upper side and by attaching the traction hook. Therefore, the above-described effect can be achieved more reliably. A method may also be used in which the plate thickness, the cross section, or the like of the frame front part is increased in place of the attachment of the spring plate reinforcing member to improve the rigidity of the frame front part.

Also, in the present invention, the rear floor is provided with a bead extending in the vehicle width direction; and the position of the bead, the division position of the frame front part and the frame rear part, and the division position of the reinforcing member front part and the reinforcing member rear part coincide with each other. Therefore, when the rear floor and the hook reinforcing member are bent in a valley form with the division position of the reinforcing member front part and the reinforcing member rear part being a base point, the rear floor is easily bent in a valley form by the bead, so that the valley-form bend occurs in the vehicle width direction reliably. As a result, the deformation load from the rear floor to a spare tire bracket is transmitted efficiently, so that the rear end portion of spare tire can jump up sufficiently.

Furthermore, in the present invention, the closed cross sectional area of the reinforcing member rear part increases toward the vehicle rear, and a substantially horizontal plane part formed in a maximum closed cross sectional area portion of the reinforcing member rear part is mounted with the traction hook. Therefore, the valley-form bend of the rear floor and the hook reinforcing member, which occurs with the load applied from the vehicle rear, can be caused to occur more reliably and rapidly. Also, the attachment rigidity of the traction hook can be secured, and also the rigidity of the reinforcing member rear part can be reinforced by the traction hook. As a result, the above-described effect can be achieved more reliably, the valley-form bend can be caused to occur smoothly, and the rear end portion of the spare tire can jump up reliably.

DETAILED DESCRIPTION OF PREFERRED EMBODIMENTS

Figure 1:
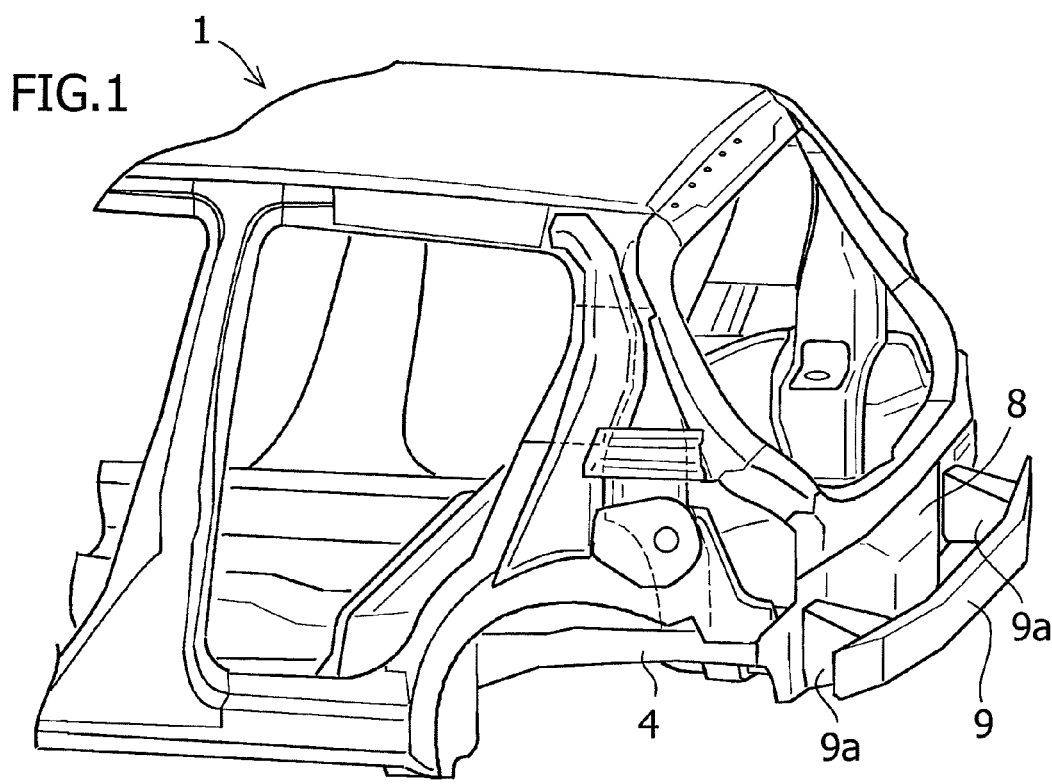
FIG. 1 is a perspective view of a vehicle body rear part of a vehicle to which a lower structure in accordance with an embodiment of the present invention is applied.
Figure 2:
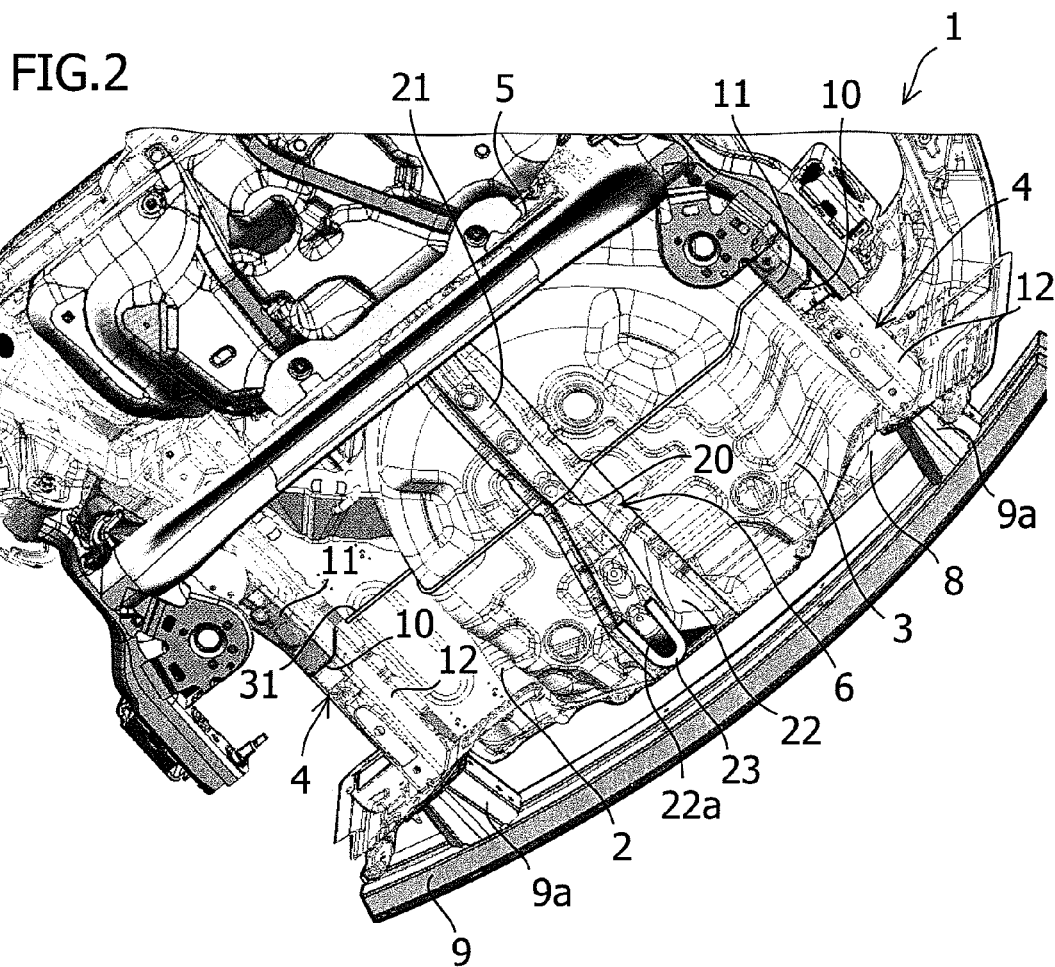
FIG. 2 is a perspective view showing the arrangement relationship of constituent members around a spare tire housing in a vehicle body rear part to which a lower structure in accordance with an embodiment of the present invention is applied, as viewed from the front slantwise lower side.
Figure 3:
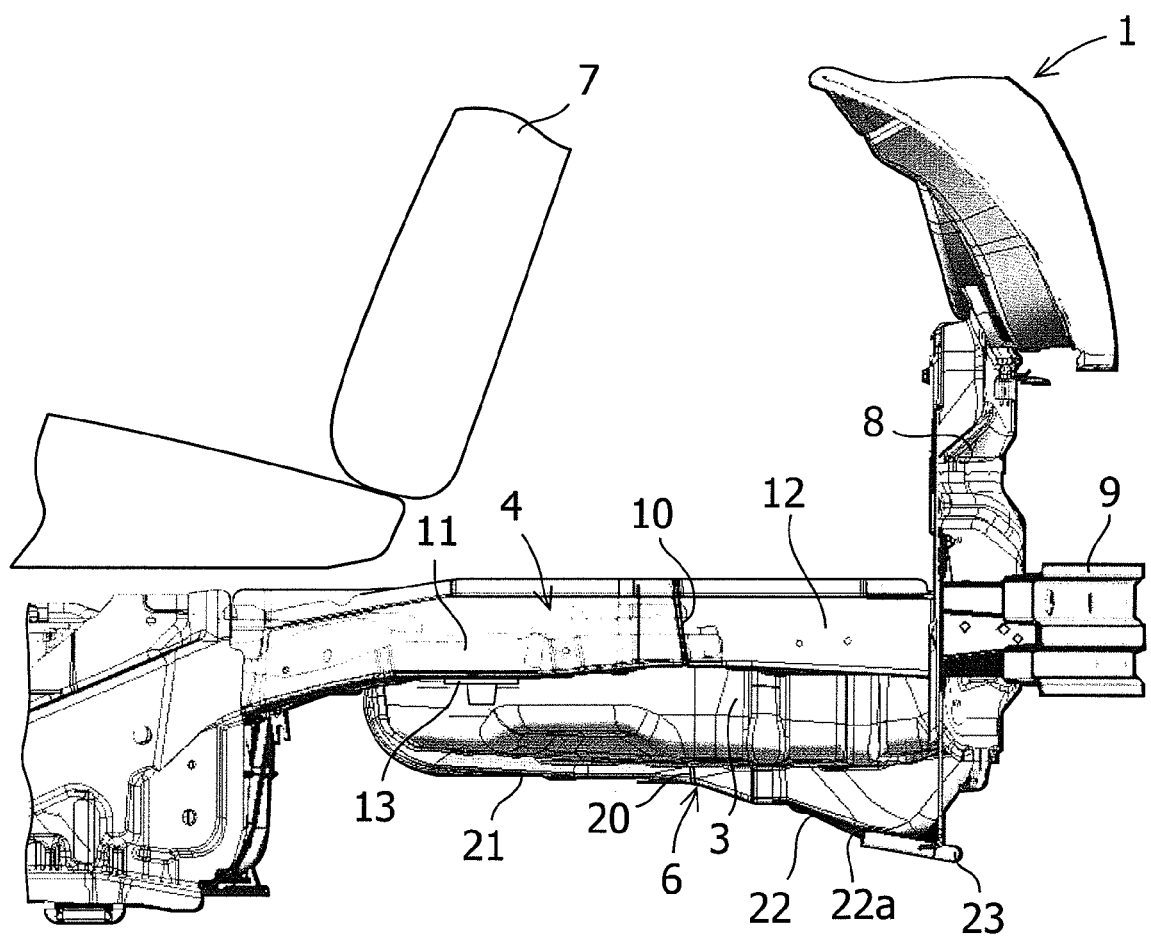
FIG. 3 is a side view showing the arrangement relationship of constituent members around a spare tire housing in a vehicle body rear part to which a lower structure in accordance with an embodiment of the present invention is applied.
Figure 4:
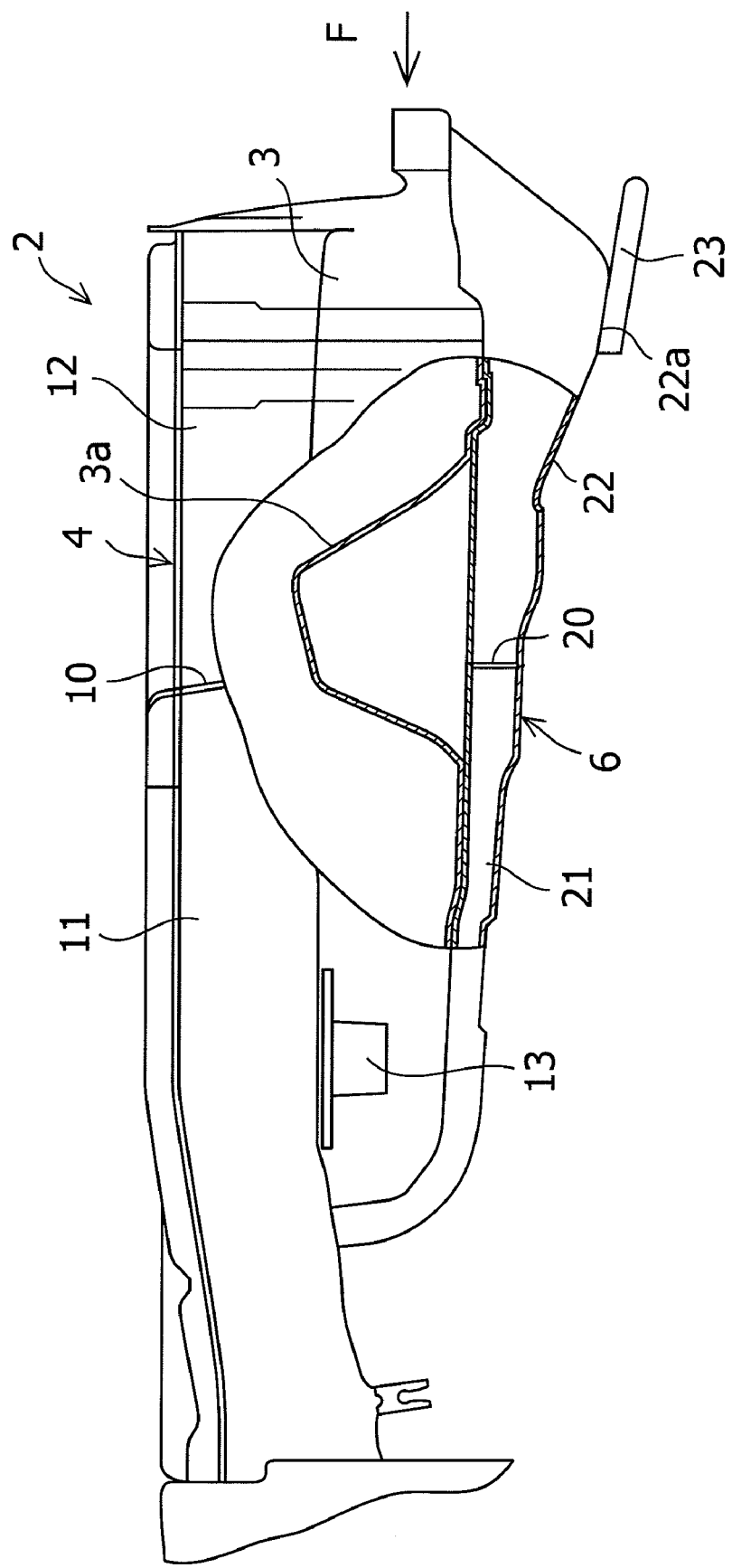
FIG. 4 is a sectional view showing the arrangement relationship of constituent members around a spare tire housing in a vehicle body rear part to which a lower structure in accordance with an embodiment of the present invention is applied.
Figure 5:
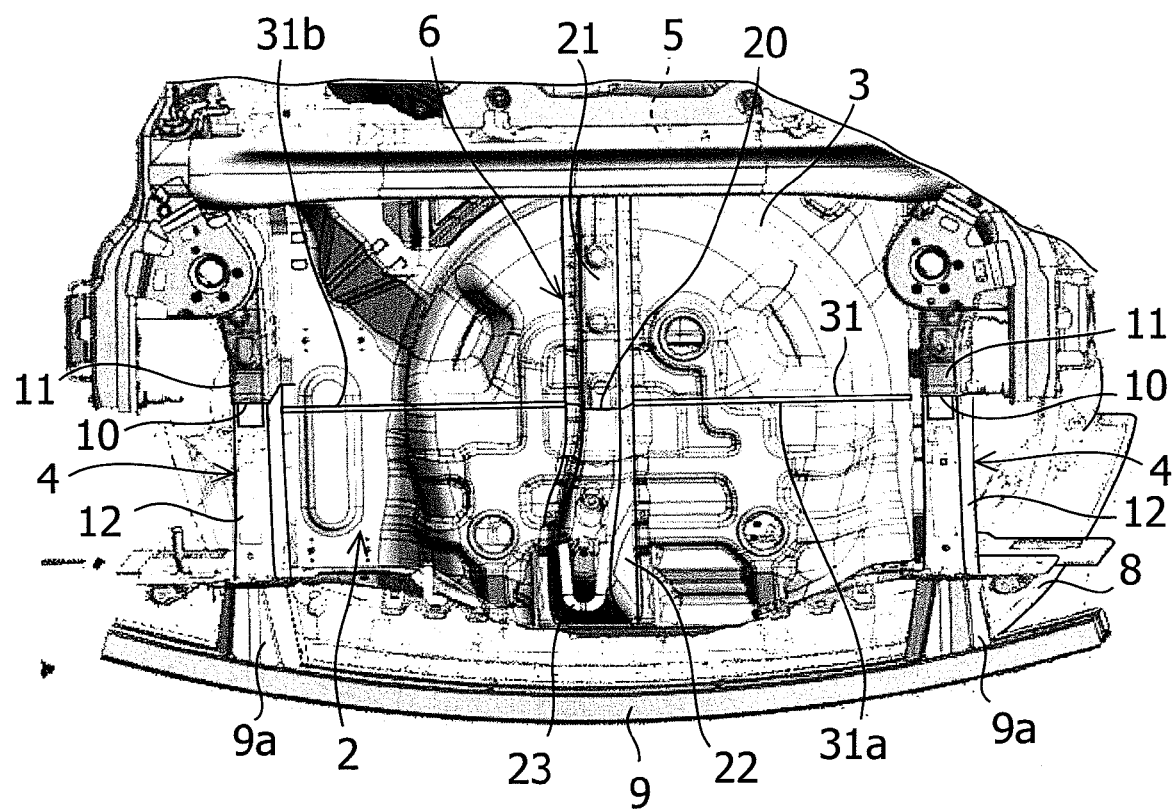
FIG. 5 is a perspective view showing the arrangement relationship of constituent members around a spare tire housing in a vehicle body rear part to which a lower structure in accordance with an embodiment of the present invention is applied, as viewed from the rear slantwise lower side.

The present invention will now be described in detail based on an embodiment shown in the accompanying drawings.

FIGS. 1 to 6 show a lower structure of a vehicle body rear part in accordance with the embodiment of the present invention.

As shown in FIGS. 1 to 5, in a lower portion of a vehicle body rear part 1 of a vehicle in accordance with the embodiment of the present invention, a rear floor 2 is provided, and in a central portion of the rear floor 2, a spare tire housing 3, which is a housing concave part for housing a horizontally placed spare tire ST (refer to FIG. 6), is formed. At a position in front of the spare tire housing 3, a rear cross member 5, which connects the right side frame and the left side frame 4 extending along the vehicle longitudinal direction to each other, is disposed, and the rear cross member 5 extends along the vehicle width direction. Also, in the center in the vehicle width direction on the lower surface of the spare tire housing 3, a hook reinforcing member 6 for a traction hook, extending along the vehicle longitudinal direction, is disposed. The front end portion of the hook reinforcing member 6 is connected to the rear cross member 5, and also the rear end portion of the hook reinforcing member 6 extends to the rear end portion of the rear floor 2.

Therefore, the lower structure of the vehicle body rear part 1 of this embodiment includes the spare tire housing 3, the side frames 4, the rear cross member 5, and the hook reinforcing member 6. On the rear floor 2 at a position in front of the spare tire housing 3, a rear seat 7 is disposed.

Also, in the rear of the spare tire housing 3, a back panel 8 and a rear bumper member 9 are disposed. The rear bumper member 9 is attached to the vehicle body rear part 1 via right and left both-side bumper attachment parts 9a, and the rear end portion of the side frame 4 and the bumper attachment part 9a are arranged in substantially a straight line along the vehicle longitudinal direction.

Furthermore, in the spare tire housing 3, a spare tire bracket 3a for attaching the central portion of the spare tire ST is provided so as to project upward, and the housed spare tire ST is tiltingly disposed in a state of being tilted forward so that the rear portion thereof is positioned above the front portion thereof.

In the lower structure of the vehicle body rear part 1 of this embodiment, the side frame 4 at the vehicle rear of the rear cross member 5 is divided into a frame front part 11 and a frame rear part 12 at a division position 10 in the vehicle longitudinal direction, and also the hook reinforcing member 6 is divided into a reinforcing member front part 21 and a reinforcing member rear part 22 at a division position 20 in the vehicle longitudinal direction. The configuration is made such that when a load is applied from the vehicle rear to the vehicle body rear part 1, the side frame 4 is deformed so as to be bent in a downward convex shape (bent in a valley form, or bent in a V shape) at the division position 10 of the frame front part 11 and the frame rear part 12, and also the rear floor 2 and the hook reinforcing member 6 are deformed so as to be bent in a downward convex shape, that is, in a valley form at the division position 20 of the reinforcing member front part 21 and the reinforcing member rear part 22.

If the side frame 4 is formed in advance so as to be curved downward slightly with the division position 10 of the frame front part 11 and the frame rear part 12 being the center, or a concave part or a bead part is formed on the upper side of the division position 10, the valley-form deformation of the side frame 4 can be induced.

Therefore, the frame front part 11 of the side frame 4 at the vehicle rear of the rear cross member 5 has a rigidity enhanced by the attachment of a spring plate reinforcing member 13, and thus has a rigidity higher than that of the frame rear part 12. Herein, a method is also conceivable in which the plate thickness, the cross section, or the like of the frame front part 11 is increased in place of the attachment of the spring plate reinforcing member 13 to improve the rigidity of the front part of the side frame 4.

Also, the hook reinforcing member 6 is formed so as to have a hat-shaped cross section, and, in a state of being attached to the lower surface of the rear floor 2, has a closed cross-sectional shape together with the rear floor 2. Moreover, of the hook reinforcing member 6, the reinforcing member rear part 22 has a larger closed cross sectional area on the lower side than on the upper side, and this closed cross sectional area increases toward the vehicle rear. Also, in a portion in which the closed cross sectional area is at a maximum of the reinforcing member rear part 22, a substantially horizontal plane part 22a is formed. To this substantially horizontal plane part 22a, a traction hook 23 the front end portion of which is fixed by welding is attached. The rear end portion of the traction hook 23 is arranged in a state of being projected slantwise downward from the reinforcing member rear part 22 toward the vehicle rear. Due to the above-described configuration, the reinforcing member rear part 22 has an enhanced rigidity, and thus has a rigidity higher than that of the reinforcing member front part 21.

Furthermore, the division position 10 of the frame front part 11 and the frame rear part 12 and the division position 20 of the reinforcing member front part 21 and the reinforcing member rear part 22 are arranged so as to coincide with each other in the vehicle longitudinal direction.

On the other hand, both side portions of the rear floor 2 are connected to the side frames 4 arranged at the right and left on both sides. Also, the rear floor 2 is provided with a bead 31 that is a ridge part extending along the vehicle width direction. The position of this bead 31, the division position 10 of the frame front part 11 and the frame rear part 12 of the side frame 4, and the division position 20 of the reinforcing member front part 21 and the reinforcing member rear part 22 of the hook reinforcing member 6 are arranged so as to coincide with each other in the vehicle longitudinal direction.

Figure 6A:
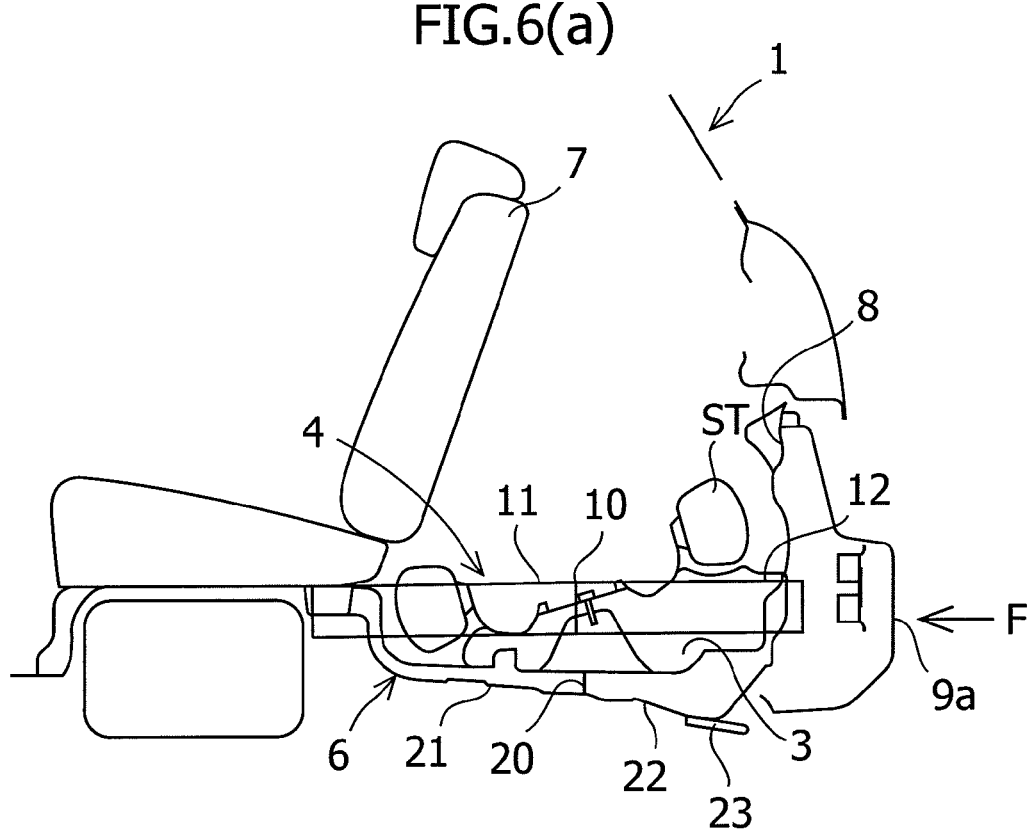
FIGS. 6A and 6B are side views showing a vehicle body rear part to which a lower structure in accordance with an embodiment of the present invention is applied, FIG. 6A being a side view showing a state before a load is applied from the vehicle rear to the vehicle body rear part, and FIG. 6B being a side view showing a state after the load has been applied.

On the vehicle to which the lower structure of the vehicle body rear part 1 in accordance with the embodiment of the present invention is applied, the state shown in FIG. 6A is a state before a load F is applied to the rear bumper member 9 of the vehicle body rear part 1 from the vehicle rear toward the vehicle front.

Figure 6B:
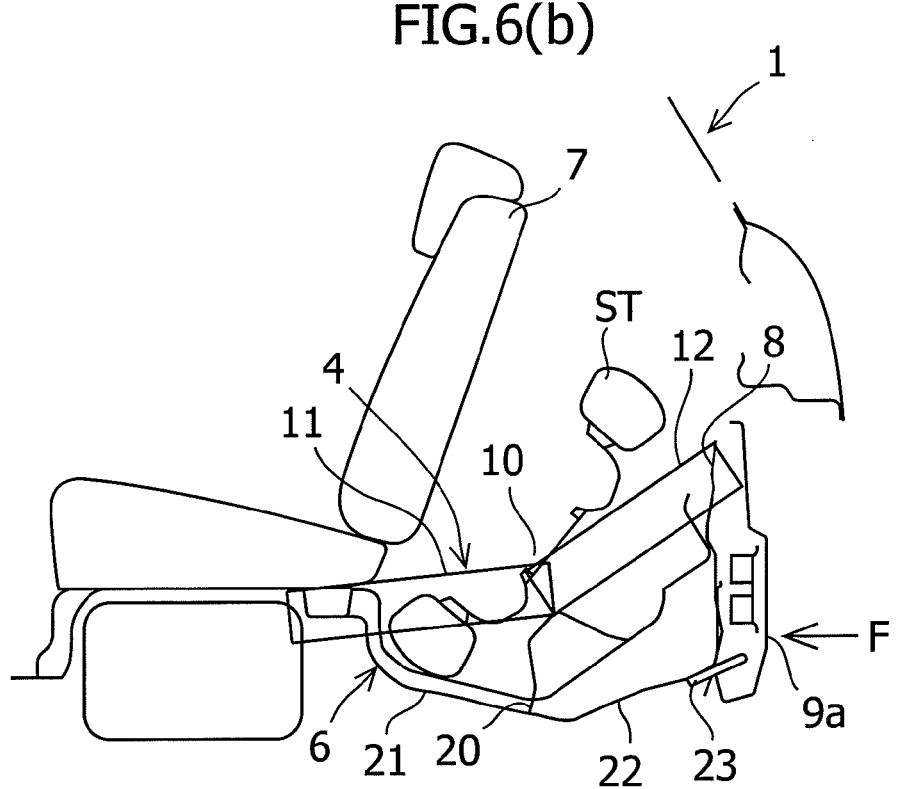

As shown in FIG. 6B, when the load F is applied from the rear bumper member 9 of the vehicle body rear part 1 to the back panel 8 and rear floor 2 thereof from the vehicle rear toward the vehicle front, the load F is transmitted to the rear portions of the side frames 4, the spare tire housing 3, and the hook reinforcing member 6 via the bumper attachment part 9a. Accordingly, the side frame 4 is deformed so that the rear end of the frame front part 11 and the front end of the frame rear part 12 are lowered at the division position 10, and the side frame 4 is bent in a downward convex shape, that is, in a valley form. At the same time, while the spare tire housing 3 is deformed, the rear floor 2 and the hook reinforcing member 6 are deformed so as to be bent in a downward convex shape at the installation position of the bead 31 and the division position 20 of the reinforcing member front part 21 and the reinforcing member rear part 22.

When the side frames 4 and the rear floor 2 and hook reinforcing member 6 are bendingly deformed in the same direction, a resistance force is generated, so that the load F applied from the vehicle rear to the vehicle body rear part is absorbed. Also, if the spare tire housing 3 is deformed by the load F, the rear portion of the spare tire ST placed so as to tilt forward jumps up with the front portion thereof being the center, and is turned greatly in the longitudinal direction toward the vehicle front.

Thus, in the lower structure of the vehicle body rear part 1 in accordance with the embodiment of the present invention, the side frame 4 at the vehicle rear of the rear cross member 5 is divided into the frame front part 11 and the frame rear part 12 in the vehicle longitudinal direction, and the hook reinforcing member 6 is divided into the reinforcing member front part 21 and the reinforcing member rear part 22 in the vehicle longitudinal direction, so that when the load F is applied from the vehicle rear to the vehicle body rear part 1, the side frame 4 is deformed so as to be bent in a downward convex shape, that is, in a valley form (in a V shape) at the division position 10 of the frame front part 11 and the frame rear part 12, and also the rear floor 2 and the hook reinforcing member 6 are deformed so as to be bent in a downward convex shape at the installation position of the bead 31 and the division position 20 of the reinforcing member front part 21 and the reinforcing member rear part 22.

Therefore, the side frames 4 and the rear floor 2 and hook reinforcing member 6 are bent in the same direction. As a result, the resistance force is generated during bending deformation, so that the load F applied from the vehicle rear to the vehicle body rear part 1 can be absorbed reliably. Also, the jumping-up of the rear portion of the spare tire ST with the front portion thereof being the center can be promoted by controlling the behavior of the spare tire ST by means of the valley-form deformation (V-shaped deformation).

Thereby, the movement of the rear cross member 5, the side frames 4, the spare tire housing 3, and the like to the vehicle front can be inhibited effectively, and therefore the contact of the spare tire housing 3 and the like with the fuel tank or the like positioned on the vehicle front side can be alleviated.

Also, in the lower structure of this embodiment, of the side frame 4 at the vehicle rear of the rear cross member 5, the frame front part 11 has a rigidity higher than that of the frame rear part 12, and of the hook reinforcing member 6, the reinforcing member rear part 22 has a rigidity higher than that of the reinforcing member front part 21. Also, the division position 10 of the frame front part 11 and the frame rear part 12 and the division position 20 of the reinforcing member front part 21 and the reinforcing member rear part 22 coincide with each other in the longitudinal direction. Therefore, when the load F is applied from the vehicle rear to the vehicle body rear part 1, the deformation of the side frame 4 proceeds from the frame rear part 12 having a low rigidity via the bumper attachment part 9a of the rear bumper member 9, and on the other hand, the reinforcing member rear part 22 begins to move to the vehicle front on receipt of the load F, the rear bumper member 9 moves to the vehicle front, and the load F is transmitted to the reinforcing member front part 21. At this time, the load F transmitted to the reinforcing member front part 21 is transmitted to the rear cross member 5. If the rear cross member 5 cannot receive the transmitted load F and is deformed by the load F, although the reinforcing member front part 21 is deformed with the connecting portion with the rear cross member 5 being the center, the reinforcing member rear part 22 keeps its shape while being deformed because of its high rigidity, and the rear end thereof moves upward. Therefore, the rear floor 2 and the hook reinforcing member 6 are deformed into a valley form, and the load F applied from the vehicle rear can be absorbed effectively.

The above is a description of the embodiment of the present invention. The present invention is not limited to the above-described embodiment, and various modifications and changes can be made based on the technical concept of the present invention.

What is claimed is:

1. A lower structure of a vehicle body rear part, comprising:
a pair of side frames spaced apart from each other in a vehicle width direction;
a spare tire housing formed on a rear floor in the vehicle body rear part, and arranged between the pair of side frames;
a rear cross member disposed in front of the spare tire housing to connect the pair of side frames to each other; and
a hook reinforcing member for a traction hook, which is disposed in the center in the vehicle width direction on a lower surface of the spare tire housing and extends in a vehicle longitudinal direction, a front end portion of the hook reinforcing member being connected to the rear cross member, and a rear end portion thereof extending to a rear end portion of the rear floor, wherein
a portion of each of the side frames rearward of the rear cross member is divided at a frame division position into a frame front part and a frame rear part with respect to the vehicle longitudinal direction, and the hook reinforcing member is divided at a reinforcing member division position into a reinforcing member front part and a reinforcing member rear part with respect to the vehicle longitudinal direction;
the frame front parts have a rigidity higher than that of the frame rear parts;
the reinforcing member rear part has a rigidity higher than that of the reinforcing member front part; and the frame division positions and the reinforcing member division position coincide with each other with respect to the vehicle longitudinal direction.

2. The lower structure according to claim 1, wherein the rigidity of each frame front part is enhanced by attaching a spring plate reinforcing member to the frame front part, and
the reinforcing member rear part has a closed cross sectional area whose width in the vehicle width direction becomes larger proceeding from an upper end of the reinforcing member rear part to a lower end thereof, and wherein the traction hook is attached to the reinforcing member rear part, so that the rigidity of the reinforcing member rear part is enhanced.

3. The lower structure according to claim 1, wherein the rear floor is provided with a bead extending in the vehicle width direction; and the position of the bead, the frame division positions, and the reinforcing member division position, coincide with one another with respect to the vehicle longitudinal direction.

4. The lower structure according to claim 1, wherein the reinforcing member rear part has a closed cross sectional area that increases in a direction toward the vehicle rear, and
the traction hook is mounted to a substantially horizontal plane part formed on a lower end of a maximum closed cross sectional area portion of the reinforcing member rear part, the maximum closed cross sectional area portion being a portion in which the closed cross sectional area of the reinforcing member rear part is maximized.

* * * * *

UNITED STATES PATENT AND TRADEMARK OFFICE
CERTIFICATE OF CORRECTION

| | | |
|---|---|---|
| PATENT NO. | : 8,308,214 B2 | Page 1 of 1 |
| APPLICATION NO. | : 12/950068 | |
| DATED | : November 13, 2012 | |
| INVENTOR(S) | : Souma et al. | |

It is certified that error appears in the above-identified patent and that said Letters Patent is hereby corrected as shown below:

<u>On the Title page,</u>
Item (73) Assignee: "Shizuoken-Ken" should read --Shizuoka-Ken--.

Signed and Sealed this
Seventh Day of May, 2013

Teresa Stanek Rea
*Acting Director of the United States Patent and Trademark Office*